(12) United States Patent
Park et al.

(10) Patent No.: US 12,355,089 B2
(45) Date of Patent: Jul. 8, 2025

(54) BATTERY MODULE AND BATTERY PACK INCLUDING THE SAME

(71) Applicant: LG ENERGY SOLUTION, LTD., Seoul (KR)

(72) Inventors: Subin Park, Daejeon (KR); Youngho Lee, Daejeon (KR); Soo Youl Kim, Daejeon (KR); Han Ki Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 725 days.

(21) Appl. No.: 17/641,325

(22) PCT Filed: Jan. 15, 2021

(86) PCT No.: PCT/KR2021/000591
§ 371 (c)(1),
(2) Date: Mar. 8, 2022

(87) PCT Pub. No.: WO2021/157899
PCT Pub. Date: Aug. 12, 2021

(65) Prior Publication Data
US 2022/0352589 A1    Nov. 3, 2022

(30) Foreign Application Priority Data
Feb. 4, 2020 (KR) .................. 10-2020-0013279

(51) Int. Cl.
*H01M 50/231*    (2021.01)
*H01M 10/653*    (2014.01)
(Continued)

(52) U.S. Cl.
CPC ....... *H01M 50/231* (2021.01); *H01M 10/653* (2015.04); *H01M 50/211* (2021.01); *H01M 50/24* (2021.01)

(58) Field of Classification Search
USPC ........................................... 320/126
See application file for complete search history.

(56) References Cited

U.S. PATENT DOCUMENTS

2004/0201365 A1* 10/2004 Dasgupta ............... B60L 58/20
                                                                320/116
2012/0257349 A1   10/2012 Bang et al.
(Continued)

FOREIGN PATENT DOCUMENTS

CN    103931019 A    7/2014
CN    208753404 U    4/2019
(Continued)

OTHER PUBLICATIONS

International Search Report (PCT/ISA/210) issued in PCT/KR2021/000591, dated May 4, 2021.
(Continued)

*Primary Examiner* — Mohammed Alam
(74) *Attorney, Agent, or Firm* — Birch, Stewart, Kolasch & Birch, LLP

(57) ABSTRACT

A battery module includes a battery cell stack in which a plurality of battery cells are stacked; a frame formed on upper, lower, left and right surfaces to house the battery cell stack; and an insulation coating layer formed on the upper, lower, left and right surfaces inside the frame, wherein a plurality of grooves corresponding to a bottom shape of the battery cell stack are formed on a lower surface inside the frame, and wherein a lower surface of the insulation coating layer is formed to be coated on the upper surface of the plurality of grooves.

14 Claims, 7 Drawing Sheets

(51) Int. Cl.
*H01M 50/211* (2021.01)
*H01M 50/24* (2021.01)

(56) References Cited

U.S. PATENT DOCUMENTS

| | | | |
|---|---|---|---|
| 2014/0113171 A1* | 4/2014 | Schaefer | H01M 10/6555 |
| | | | 165/185 |
| 2014/0242429 A1 | 6/2014 | Lee et al. | |
| 2015/0104677 A1* | 4/2015 | Koh | H01M 10/425 |
| | | | 429/7 |
| 2017/0141023 A1 | 5/2017 | Arisaka et al. | |
| 2017/0190264 A1 | 7/2017 | Kim et al. | |
| 2018/0138565 A1 | 5/2018 | Lee et al. | |
| 2018/0331336 A1 | 11/2018 | Choi et al. | |
| 2019/0051954 A1 | 2/2019 | Kim et al. | |
| 2019/0280265 A1 | 9/2019 | Jansen et al. | |
| 2019/0326571 A1 | 10/2019 | Wuensche et al. | |
| 2020/0185797 A1 | 6/2020 | Park et al. | |
| 2020/0194851 A1 | 6/2020 | Seo et al. | |
| 2020/0343607 A1 | 10/2020 | Kim et al. | |
| 2020/0411924 A1 | 12/2020 | Yun | |
| 2021/0320385 A1* | 10/2021 | Kim | H01M 50/284 |
| 2022/0352589 A1* | 11/2022 | Park | H01M 50/24 |
| 2023/0282925 A1* | 9/2023 | Jang | H01M 50/291 |
| | | | 429/159 |

FOREIGN PATENT DOCUMENTS

| | | | | |
|---|---|---|---|---|
| CN | 114287083 A | * | 4/2022 | ......... H01M 10/613 |
| JP | 3-12906 A | | 1/1991 | |
| JP | 2006-318703 A | | 11/2006 | |
| JP | 2018-510463 A | | 4/2016 | |
| JP | 2017-98306 A | | 6/2017 | |
| JP | 2018-518032 A | | 7/2018 | |
| JP | 2019-508846 A | | 3/2019 | |
| KR | 10-2011-0072241 A | | 6/2011 | |
| KR | 10-2012-0048802 A | | 5/2012 | |
| KR | 10-2016-0040859 A | | 4/2016 | |
| KR | 10-2017-0036639 A | | 4/2017 | |
| KR | 10-2017-0082041 A | | 7/2017 | |
| KR | 10-2017-0107798 A | | 9/2017 | |
| KR | 10-2018-0020546 A | | 2/2018 | |
| KR | 10-2018-0084539 A | | 7/2018 | |
| KR | 10-2019-0069872 A | | 6/2019 | |
| KR | 10-2019-0107900 A | | 9/2019 | |
| WO | WO 2018/022907 A1 | | 2/2018 | |
| WO | WO 2019/182251 A1 | | 9/2019 | |

OTHER PUBLICATIONS

Extended European Search Report for European Application No. 21750076.8, dated Feb. 27, 2023.

* cited by examiner

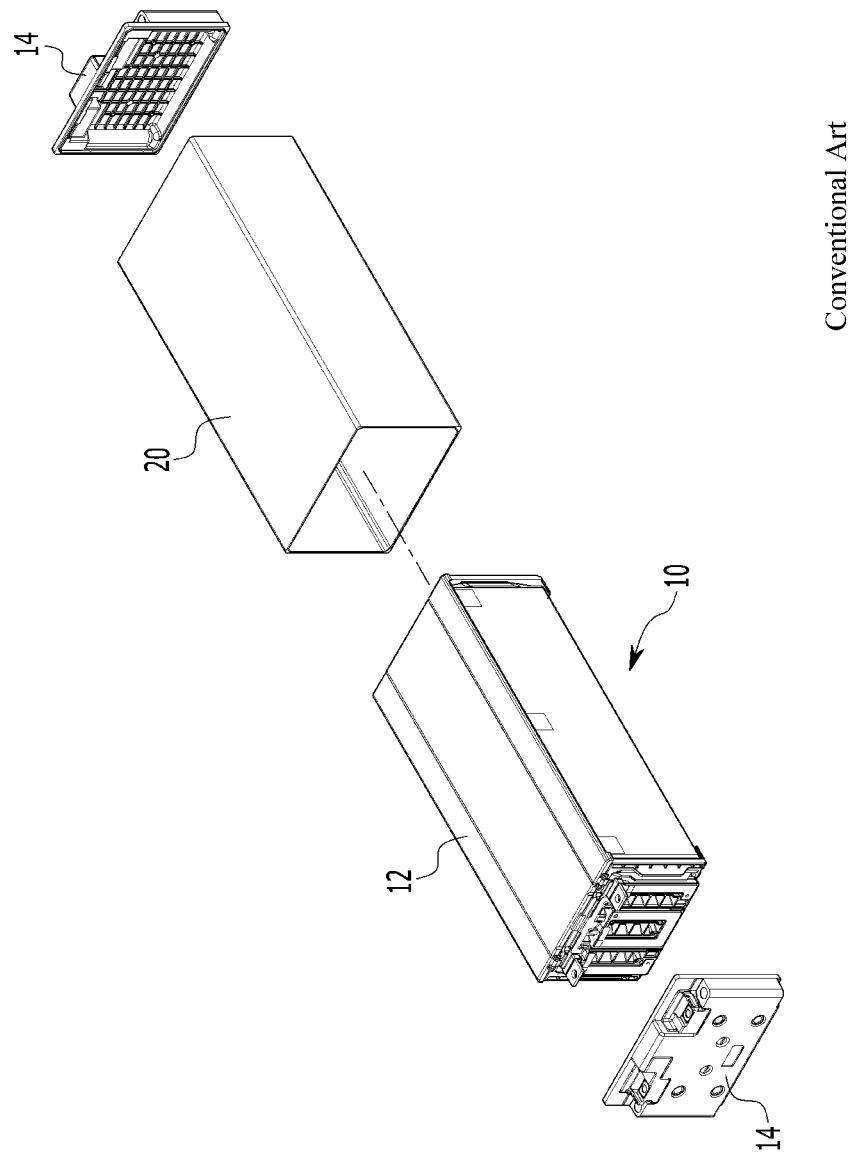
[FIG. 1]
Conventional Art

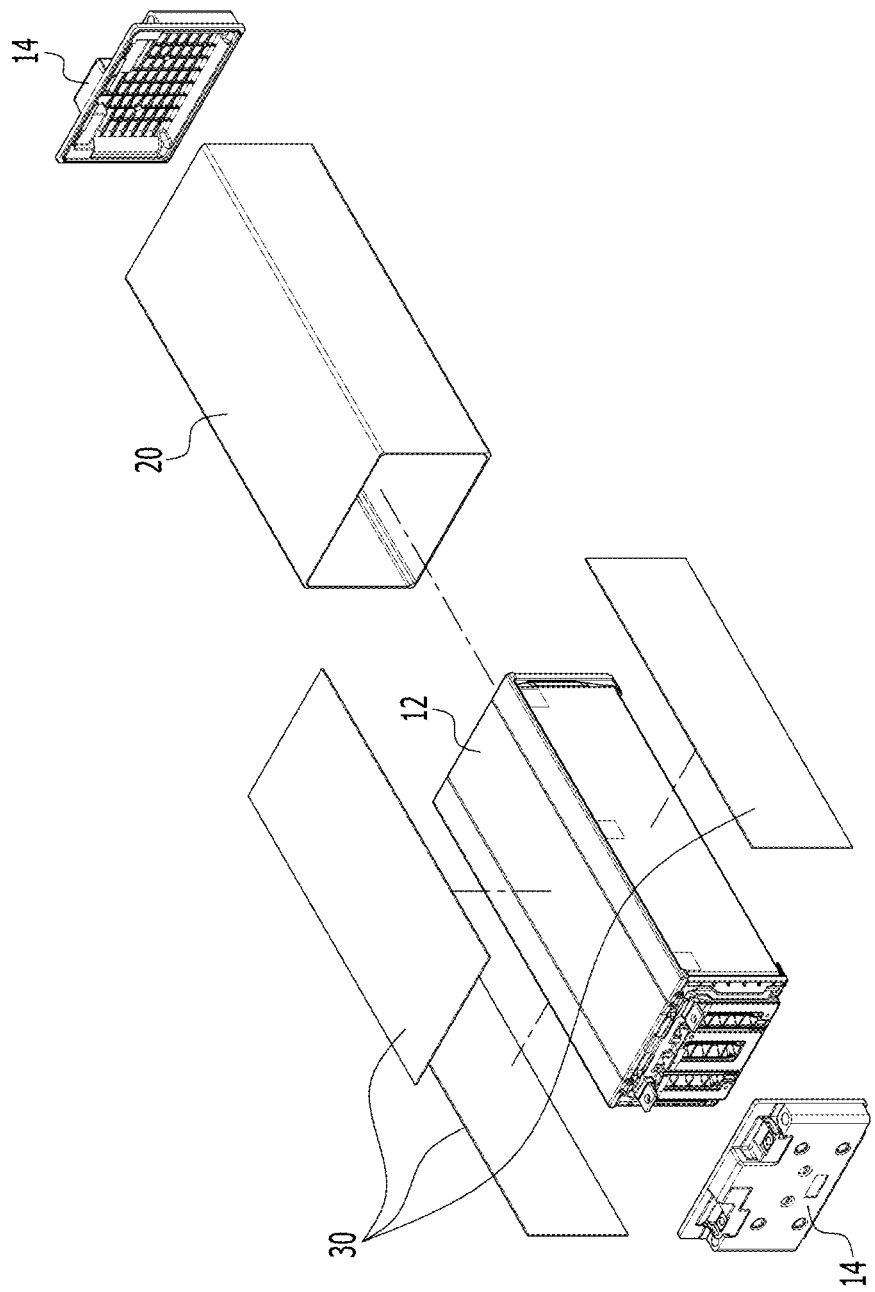
[FIG. 2]

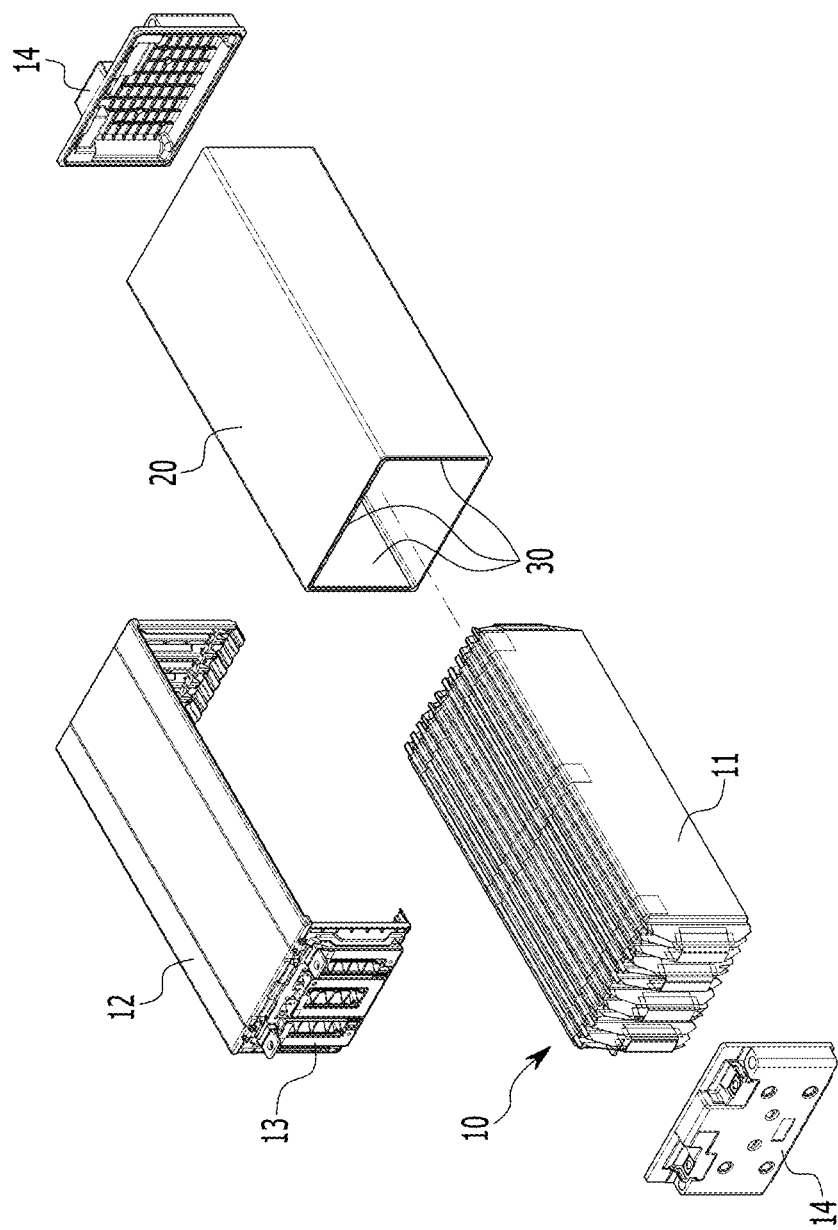
[FIG. 3]

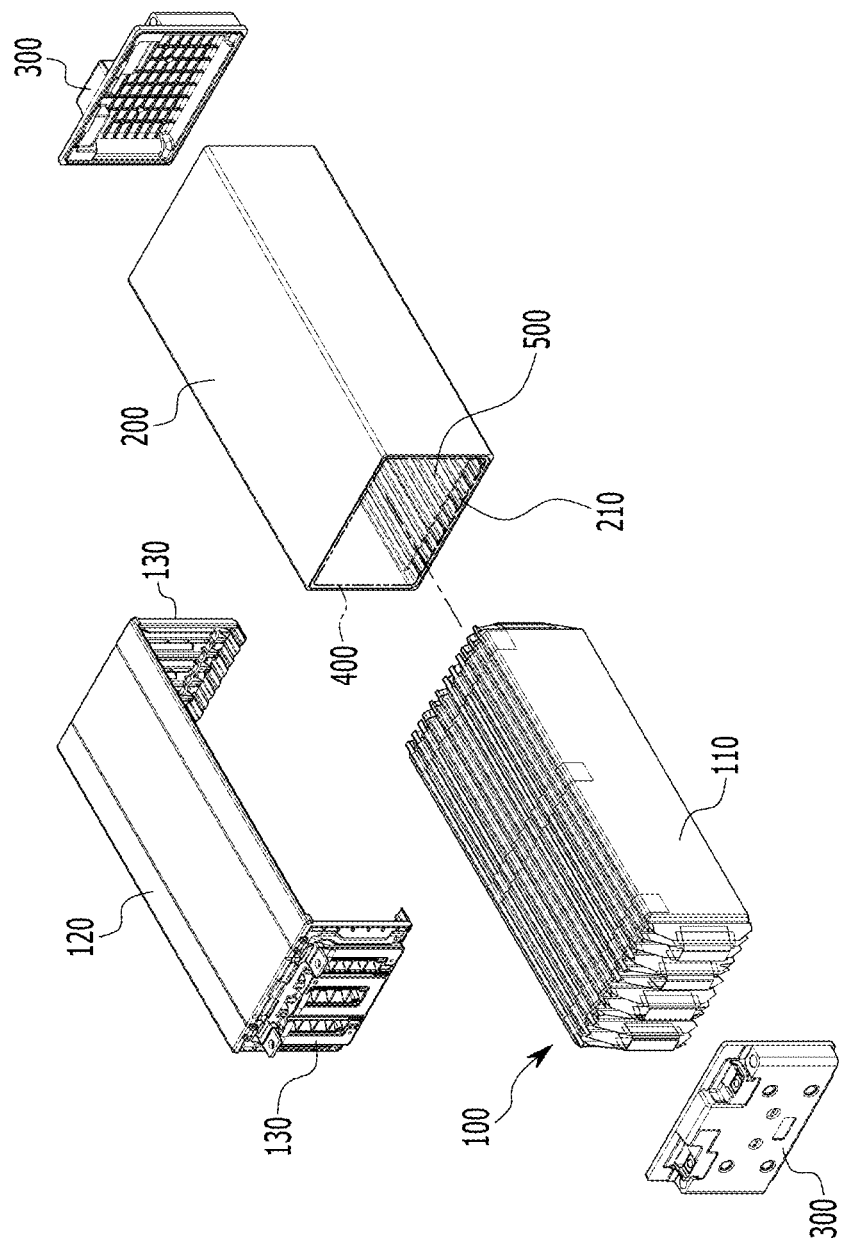
[FIG. 4]

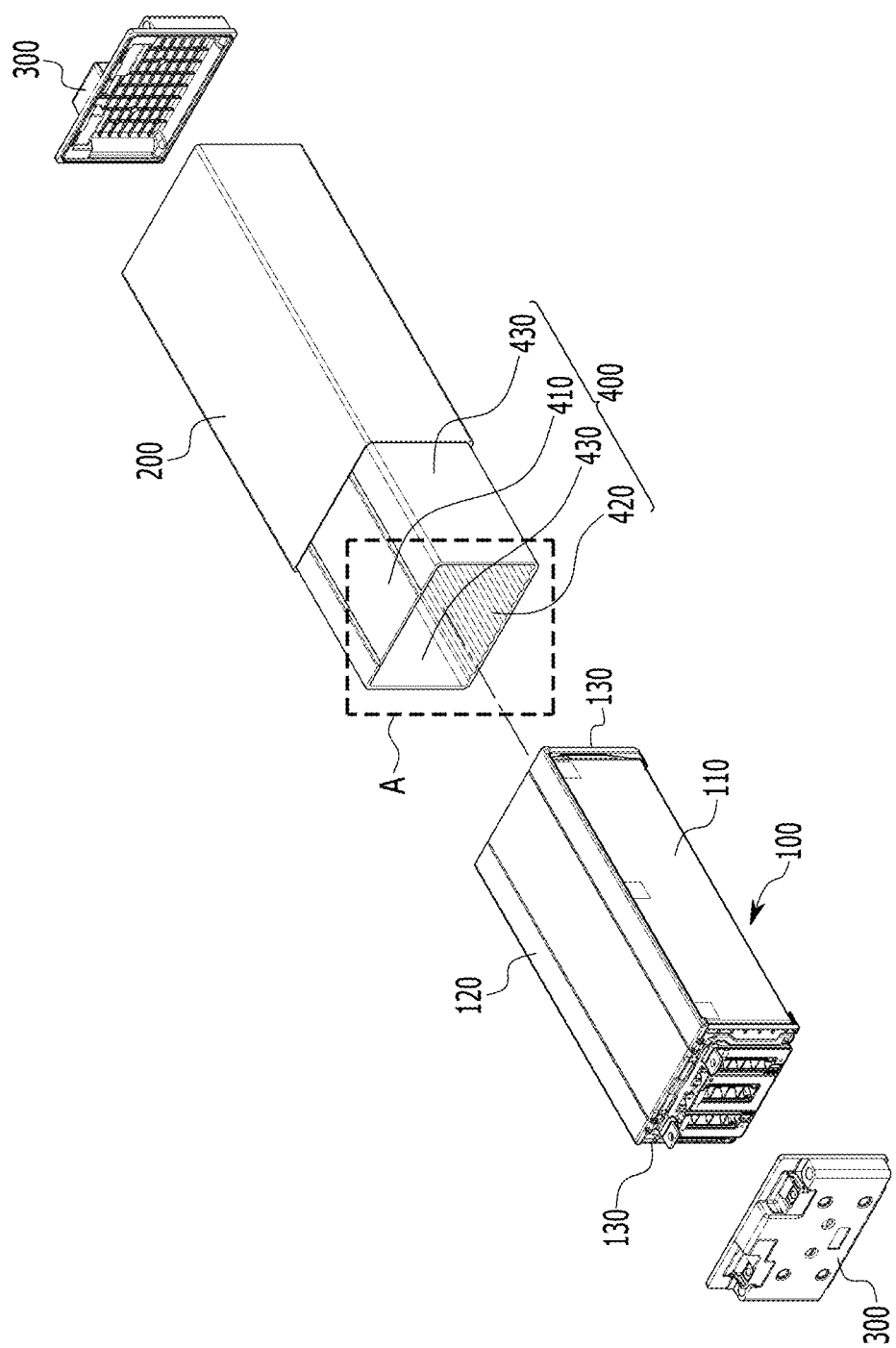
[FIG. 5]

[FIG. 6]
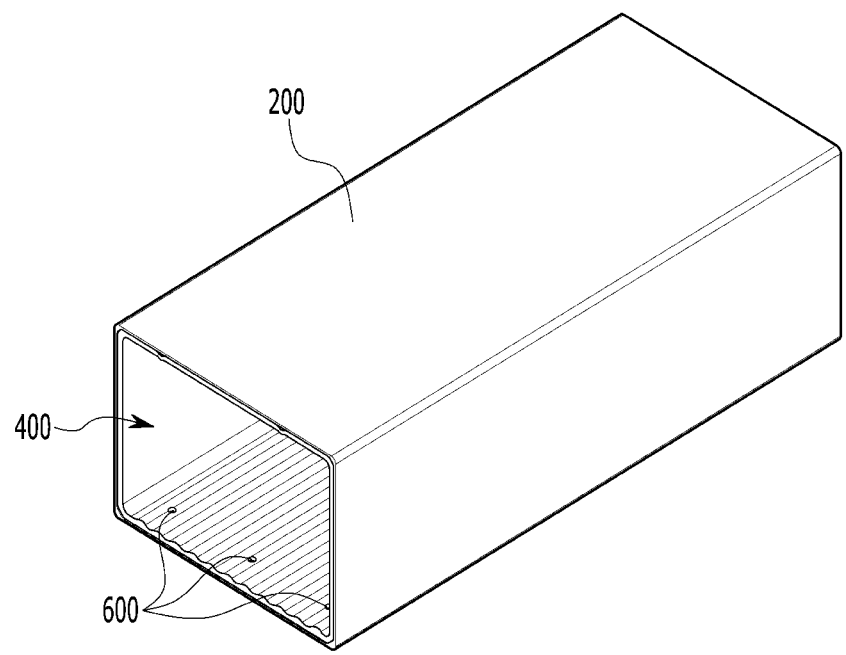
[FIG. 7]
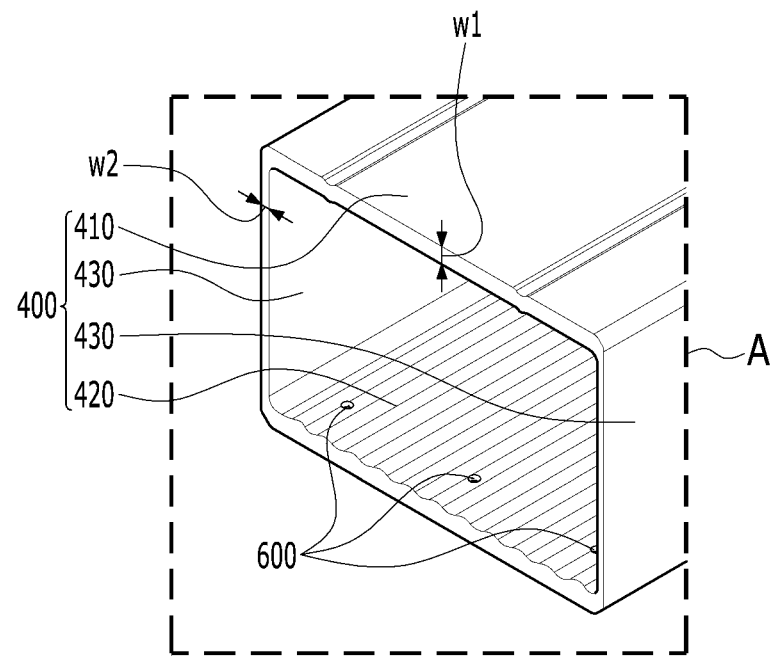

[FIG. 8]
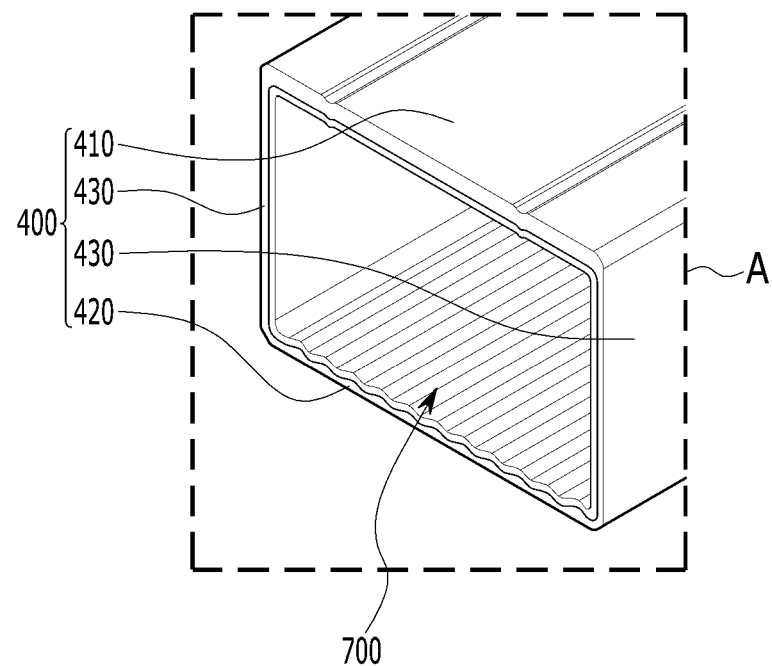

BATTERY MODULE AND BATTERY PACK INCLUDING THE SAME

CROSS CITATION WITH RELATED APPLICATION(S)

This application claims the benefit of Korean Patent Application No. 10-2020-0013279 filed on Feb. 4, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module with ensured insulation performance and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

Such a battery module may include a battery cell stack in which a plurality of battery cells are stacked, a frame for housing the battery cell stack, and an end plate for covering the front and rear surfaces of the battery cell stack.

FIG. 1 is an exploded perspective view showing an appearance of a conventional battery module. FIG. 2 is an exploded perspective view showing a state in which an insulating member is added to the conventional battery module of FIG. 1. FIG. 3 is a view showing a state in which the insulating member of FIG. 2 is mounted on an inner surface of a frame.

Referring to FIG. 1, the conventional battery module includes a battery cell stack 10 in which a plurality of battery cells are stacked, a frame 20 formed on the upper, lower, left, and right surfaces to house the battery cell stack 10, an upper plate 12 for covering the upper surface of the battery cell stack 10, and an end plate 14 for covering front and rear surfaces of the battery cell stack 10. The battery module is a cell stack structure in which multiple battery cells are stacked, and is exposed under a use environment where high current and high voltage are applied, and for safety reasons, it is essential to secure insulation performance between the battery cell stack and the external frame. Therefore, in the case of the battery module shown in FIG. 1, it is difficult to secure the insulation performance.

Thus, as shown in FIGS. 2 and 3, an insulating member 30 is arranged on an inner surface of the frame 20, that is, between the battery cell stack 10 and the frame 20 in which the plurality of battery cells 11 are stacked, thereby cutting off the electrical connection between the battery cell stack 10 and the outside. In this case, the insulating member 30 may be formed of an insulation sheet, an insulation pad, or an insulation tape, but as the insulating member 30 is added as a separate component, there is a concern that energy density of the battery module is decreased. Further, in the process of locating the insulating member 30 between the battery cell stack 10 and the frame 20, there is a problem that the assembling becomes difficult.

DETAILED DESCRIPTION OF THE INVENTION

Technical Problem

It is an object of the present disclosure to provide a battery module that can secure insulation performance without additional components, and a battery pack including the same.

However, the problem to be solved by embodiments of the present disclosure is not limited to the above-described problems, and can be variously expanded within the scope of the technical idea included in the present disclosure.

Technical Solution

In order to realize the above object, one embodiment of the present disclosure provides a battery module and a battery pack including the same, the battery module comprising: a battery cell stack in which a plurality of battery cells are stacked; a frame having an upper surface, a lower surface, a left surface and a right surface to house the battery cell stack, and an insulation coating layer having an upper surface, a lower surface, a left surface and a right surface respectively formed on the upper surface, the lower surface, the left surface and the right surface, wherein a plurality of grooves corresponding to a bottom shape of the battery cell stack are formed on the lower surface of the frame, and wherein the lower surface of the insulation coating layer is coated on an upper surface of the plurality of grooves.

The battery module may further comprise a thermally conductive resin layer between the lower portion of the battery cell stack, and the frame and the insulation coating layer.

An injection hole may be formed on the lower surface of the frame and the lower surface of the insulation coating layer, and the thermally conductive resin may be injected through the injection hole.

The battery module may further comprise an insulation a coating protective layer covering the insulation coating layer.

The upper surface and the lower surface of the insulation coating layer may be thicker than the left surface and the right surface of the insulation coating layer.

The insulation coating layer may be formed by coating of an epoxy, a polyester, or a powder.

The insulation coating layer may be coated in a thickness of 50 to 300 micrometers.

The battery module may further comprise an end plate for covering a front surface and a rear surface of the battery cell stack.

The battery module may further comprise an upper plate for covering an upper surface of the battery cell stack, wherein the upper surface of the insulation coating layer may be formed between the frame and the upper plate.

Advantageous Effects

A battery module and a battery pack including the same according to an embodiment of the present disclosure provide an effect of securing insulation performance only by coating without additional components through an insulation coating layer formed inside the frame.

Further, the battery module and the battery pack including the same according to an embodiment of the present disclosure can secure insulation performance only by coating, thereby improving energy density, reducing the manufacturing cost, and improving the assembly characteristics of the battery module.

The objects solved by embodiments of the present disclosure is not limited to the above-described objects, and other objects, which are not described above, may be clearly understood by those skilled in the art through the following description.

BRIEF DESCRIPTION OF THE DRAWINGS

FIG. 1 is an exploded perspective view showing an appearance of a conventional battery module.

FIG. 2 is an exploded perspective view showing a state in which an insulating member is added to the conventional battery module of FIG. 1.

FIG. 3 is a view showing a state in which the insulating members of FIG. 2 are mounted on an inner surface of a frame.

FIG. 4 is an exploded perspective view showing a battery module according to an embodiment of the present disclosure.

FIG. 5 is an exploded perspective view showing an insulation coating layer according to an embodiment of the present disclosure.

FIG. 6 is a perspective view showing an injection hole formed in a frame according to an embodiment of the present disclosure.

FIG. 7 is an exploded perspective view showing an insulation coating layer cut away from the part A of FIG. 5, according to another embodiment of the present disclosure.

FIG. 8 is an exploded perspective view showing an insulation coating layer cut away from the part A of FIG. 5, according to still another embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

The terms such as first, second, and the like may be used to describe various components and the components should not be limited by these terms. The terms are used simply to distinguish one constituent element from another component.

Further, the terms used herein are used only to describe specific exemplary embodiments, and are not intended to limit the scope of the present disclosure. A singular form may include a plural form if there is no clearly opposite meaning in the context. In this disclosure, terms such as 'include' and 'comprises' should be understood as designating as including such features, numbers, operations, elements, components or a combination thereof in the disclosure, and not to exclude the existence or possibility of adding one or more of other features, numbers, operations, elements, components or a combination thereof.

Hereinafter, a battery module in which an insulation coating layer is formed according to an embodiment of the present disclosure will be described with reference to FIGS. 4 to 6.

FIG. 4 is an exploded perspective view showing a battery module according to an embodiment of the present disclosure. FIG. 5 is an exploded perspective view showing an insulation coating layer according to an embodiment of the present disclosure. FIG. 6 is a perspective view showing an injection hole formed in a frame according to an embodiment of the present disclosure.

Referring to FIGS. 4 to 6, a battery module according to an embodiment of the present disclosure comprises a battery cell stack 100 in which a plurality of battery cells 110 are stacked, a frame 200 that is formed on upper, lower, left, and right surface to house the battery cell stack 100, and an insulation coating layer 400 formed on the upper, lower, left, and right surfaces inside the frame 200, wherein a plurality of grooves 210 corresponding to a bottom shape of the battery cell stack 100 are formed on a lower surface inside the frame 100, and wherein a lower surface 420 of the insulation coating layer 400 may be formed to be coated on the upper surface of the plurality of grooves 210.

The battery cell 110 is a secondary battery and may be configured as a pouch-type secondary battery. The battery cell 110 may be composed of a plurality of cells, and the plurality of battery cells 110 may be stacked with each other so as to be electrically connected therebetween, thereby forming the battery cell stack 100. Each of the plurality of battery cells may include an electrode assembly, a battery case, and an electrode lead protruding from the electrode assembly.

The frame 200 may be formed on upper, lower, left, and right surfaces so as to cover the upper, lower, left, and right surfaces of the battery cell stack 100. The battery cell stack 100 housed inside the frame 200 may be physically protected by the frame 200.

A bus bar frame 130 may be formed on front and rear surfaces of the battery cell stack 100. A plurality of bus bars may be formed on an outer surface of the bus bar frame 130, and electrode leads protruding from the plurality of battery cells 110 may be formed to make contact with the plurality of bus bars. Thereby, the bus bar frame 130 may electrically connect the plurality of battery cells 110 and an external power.

An upper plate 120 may be formed on an upper surface of the battery cell stack 100 to cover the battery cell stack 100. The upper plate 120 may connect the bus bar frame 130 from the upper side of the battery cell stack 100. The bus bar frame 130 may be coupled to front and rear ends of the upper plate. The upper plate 120 and the bus bar frame 130 may be coupled by a hinge. Therefore, after the upper plate 120 is seated on the upper surface of the battery cell stack 100, the bus bar frame 130 connected to the front and rear ends of the upper plate 120 rotates around a hinge axis, so that the bus bar frame 130 can be coupled to the front and rear surfaces of the battery cell stack 100. The upper surface 410 of the insulation coating layer described later may be formed between the frame 200 and the upper plate 120.

An end plate 300 may be formed on the outside of the bus bar frame 130 on the base of the battery cell stack 100 so as to cover the front and rear surfaces of the battery cell stack 100 and the bus bar frame 130. The end plate 300 protects the busbar frame 130, the battery cell stack 100, and various electrical equipment connected thereto from external impacts, while guiding the electrical connection between the battery cell stack 100 and an external power.

According to an embodiment of the present disclosure, an insulation coating layer 400 is formed on upper, lower, left, and right surfaces inside the frame 200. The insulation coating layer 400 can be formed between the frame 200 and the battery cell stack 100 to cut off electrical connection between the battery cell stack 100 and the outside. Conventionally, an insulating member such as an insulation sheet, an insulation pad, and an insulation tape was arranged between the frame 200 and the battery cell stack 100 to perform insulating function between the battery cell stack 100 and the frame 200. However, if the insulating member is added as a separate component, there is a problem that energy density of the battery module may decrease, thereby requiring a separate process of assembling the insulating member.

Accordingly, according to an embodiment of the present disclosure, the insulation performance between the battery cell stack 100 and the frame 200 can be secured with only the process of coating an insulation material on the inner surface of the frame 200. In addition, since there is no need to insert separate components for insulation, the energy density of the battery module can be improved, the assembling characteristics can be enhanced, and the assembling costs can be reduced.

According to an embodiment of the present disclosure, the insulation coating layer 400 may be formed by coating of an epoxy, a polyester, or a powder. In addition, in consideration of the energy density, the insulation coating layer 400 may be coated in a thickness of 50 to 300 micrometers.

A thermally conductive resin layer 500 may be formed between a lower portion of the battery cell stack 100, and the frame 200 and the insulation coating layer 400 by injecting the thermally conductive resin to a lower surface of the frame 200.

A plurality of grooves 210 corresponding to the bottom shape of the battery cell stack 100 are formed on the lower surface inside the frame 200. Since the plurality of grooves 210 are formed on the lower surface of the frame 200, rigidity of the frame 200 is reinforced as a whole, and an injection amount of the thermally conductive resin for forming the thermally conductive resin layer 500 can be reduced. Moreover, because the plurality of grooves 210 are formed only on the lower surface of the frame 200, the battery cell stack 100, the upper plate 120, the bus bar frame 130, and the like provide an effect capable of preventing the phenomenon of being inversely assembled inside the frame 200. The insulation coating layer 400 may be formed to be coated on the upper surfaces of the plurality of grooves 210.

Referring to FIG. 6, an injection hole 600 may be formed on the lower surface of the frame 200 and the lower surface of the insulation coating layer 400. The thermally conductive resin may be injected into the frame 200 through the injection hole 600 to form the thermally conductive resin layer 500 in a space of the lower surface of the frame 200. The injection hole 600 may be formed through the lower surface of the frame 200, the plurality of grooves 210 and the insulation coating layer 400.

Hereinafter, an insulation coating layer according to another embodiment of the present disclosure will be described with reference to FIGS. 4 and 7.

FIG. 4 is an exploded perspective view showing a battery module according to an embodiment of the present disclosure. FIG. 7 is an exploded perspective view showing an insulation coating layer cut away from the part A of FIG. 5, according to another embodiment of the present disclosure.

The insulation coating layer 400 may be formed by an upper surface 410, a lower surface 420, and left and right surfaces 430 of the insulation coating layer. In this case, a thickness w1 of the upper surface 410 and the lower surface 420 of the insulation coating layer may be thicker than a thickness w2 of the left and right surfaces 430 of the insulation coating layer.

A plurality of grooves 210 are formed on a lower surface inside the frame 200, and an upper plate 120 is formed on an upper surface inside the frame 200, so that when the battery cell stack 100 and an upper plate 120 mounted on the upper end of the battery cell stack 100 are inserted into the frame 200 on which the insulation coating layer 400 is formed, there is a concern that a part of the upper surface 410 of the insulation coating layer and the lower surface 420 of the insulation coating layer may be peeled off or formed unevenly by a shift phenomenon, due to friction between the upper surface and the lower surface inside the upper plate 120 and the frame 200.

Thus, according to another embodiment of the present disclosure, in order to minimize the possibility of peeling off or non-uniformity due to the friction, the thickness w1 of the upper surface 410 of the insulation coating layer and the lower surface 420 of the insulation coating layer is formed to be thicker than the thickness w2 of the left and right surfaces 430 of the insulation coating layer, whereby the insulation coating layer 400 can be protected and the insulation performance through the insulation coating layer 400 cannot be deteriorated.

Hereinafter, an insulation coating layer according to still another embodiment of the present disclosure will be described with reference to FIGS. 4 and 8.

FIG. 4 is an exploded perspective view showing a battery module according to an embodiment of the present disclosure. FIG. 8 is an exploded perspective view showing an insulation coating layer cut away from the part A of FIG. 5, according to still another embodiment of the present disclosure.

Referring to FIG. 8, the insulation coating layer according to another embodiment of the present disclosure may further include an insulation coating protective layer 700 for covering the insulation coating layer 400.

When the components such as the battery cell stack 100, the bus bar frame 130, and the upper plate 120 are inserted into the frame 200 on which the insulation coating layer 400 is formed, there is a concern that the insulation coating layer 400 is damaged due to friction between the insulation coating layer 400 and the inserted components. However, another embodiment of the present disclosure may further include the insulation coating protective layer 700 that is formed so as to cover the insulation coating layer 400. Through the insulation coating protective layer 700, the insulation coating layer 400 can be protected from the friction with the components during assembly of the battery module, the insulation performance of the battery module can be secured, and the insulation coating protective layer 700 may further enhance the insulation performance of the battery module through its own insulation performance.

The above-mentioned battery module can be included in the battery pack. The battery pack may have a structure in which one or more of the battery modules according to this embodiment are gathered, and packed together with a battery management system (BMS) and a cooling device that control and manage battery's temperature, voltage, etc.

The above-mentioned battery module or the battery pack including the same can be applied to various devices. These devices may be applied to transportation means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell stack
110: battery cell
120: upper plate
130: busbar frame
200: frame
210: a plurality of grooves
300: end plate
400: insulation coating layer
410: upper surface of the insulation coating layer
420: lower surface of the insulation coating layer
430: left and right surfaces of the insulation coating layer
500: thermally conductive resin layer
600: injection hole
700: insulation coating protective layer

The invention claimed is:

1. A battery module comprising:
    a battery cell stack in which a plurality of battery cells are stacked,
    a frame having an upper surface, a lower surface, a left surface and a right surface to house the battery cell stack, and
    an insulation coating layer having an upper surface, a lower surface, a left surface and a right surface respectively formed on the upper surface, the lower surface, the left surface and the right surface of the frame,
    wherein a plurality of grooves corresponding to a bottom shape of the battery cell stack are formed on the lower surface of the frame, and
    wherein the lower surface of the insulation coating layer is coated on an upper surface of the plurality of grooves.

2. The battery module according to claim 1, further comprising a thermally conductive resin layer between the lower portion of the battery cell stack, and the frame and the insulation coating layer.

3. The battery module according to claim 2, wherein an injection hole is formed on the lower surface of the frame and the lower surface of the insulation coating layer, and the thermally conductive resin is injected through the injection hole.

4. The battery module according to claim 1, further comprising an insulation coating protective layer covering the insulation coating layer.

5. The battery module according to claim 1, wherein the upper surface and the lower surface of the insulation coating layer are thicker than the left surface and the right surface of the insulation coating layer.

6. The battery module according to claim 1, wherein the insulation coating layer is formed by coating of an epoxy, a polyester, or a powder.

7. The battery module according to claim 1, wherein the insulation coating layer is coated in a thickness of 50 to 300 micrometers.

8. The battery module according to claim 1, further comprising an end plate for covering a front surface and a rear surface of the battery cell stack.

9. The battery module according to claim 1, further comprising an upper plate covering an upper surface of the battery cell stack,
    wherein the upper surface of the insulation coating layer is formed between the frame and the upper plate.

10. A battery pack comprising the battery module as set forth in claim 1.

11. The battery module according to claim 1, wherein the plurality of battery cells are stacked in a first direction, and
    wherein the left surface and the right surface of the frame are spaced from each other in the first direction and the lower surface of the frame extends between the left surface and the right surface of the frame.

12. The battery module according to claim 1, wherein the insulation coating layer forms a continuous layer covering the upper surface, the lower surface, the left surface and the right surface of the frame.

13. The battery module according to claim 1, further comprising bus bar frame on a front surface and a rear surfaces of the battery cell stack.

14. The battery module according to claim 13, further comprising an end plate for covering the front surface and the rear surface of the battery cell stack.

* * * * *